(12) United States Patent
Haberman et al.

(10) Patent No.: US 11,398,161 B1
(45) Date of Patent: Jul. 26, 2022

(54) SYSTEMS AND METHODS FOR DETECTING UNUSUALLY FREQUENT EXACTLY MATCHING AND NEARLY MATCHING TEST RESPONSES

(71) Applicant: Educational Testing Service, Princeton, NJ (US)

(72) Inventors: Shelby J. Haberman, Jerusalem (IL); Yi-Hsuan Lee, Princeton Junction, NJ (US); Paul Papierman, Bridgewater, NJ (US); Yuxing Zhou, Lawrenceville, NJ (US); Ruchi Subhedar, North Brunswick, NJ (US)

(73) Assignee: Educational Testing Service, Princeton, NJ (US)

( * ) Notice: Subject to any disclaimer, the term of this patent is extended or adjusted under 35 U.S.C. 154(b) by 698 days.

(21) Appl. No.: 16/409,136

(22) Filed: May 10, 2019

Related U.S. Application Data (60) Provisional application No. 62/743,783, filed on Oct. 10, 2018, provisional application No. 62/669,432, filed on May 10, 2018.

(51) Int. Cl.
  *G09B 7/00* (2006.01)
  *G06F 11/30* (2006.01)
  *G06F 11/34* (2006.01)

(52) U.S. Cl.
  CPC ............ *G09B 7/00* (2013.01); *G06F 11/3013* (2013.01); *G06F 11/3438* (2013.01)

(58) Field of Classification Search
  CPC .... G09B 7/00; G06F 11/3013; G06F 11/3438
  See application file for complete search history.

(56) References Cited

U.S. PATENT DOCUMENTS

| 9,280,907 | B2 * | 3/2016 | Dorman | G09B 7/07 |
| 10,249,207 | B2 * | 4/2019 | Solomon | G09B 7/04 |
| 10,467,922 | B2 * | 11/2019 | Jackman | H04L 29/00 |
| 2012/0276516 | A1 * | 11/2012 | Teskey | G09B 5/00 |
| | | | | 434/362 |

(Continued)

OTHER PUBLICATIONS

Adams, Raymond, Wilson, Mark, Wang, Wen-chung; The Multidimensional Random Coefficients Multinomial Logit Model; Applied Psychological Measurement, 21(1); pp. 1-23; Mar. 1997.

(Continued)

*Primary Examiner* — David E Choi
(74) *Attorney, Agent, or Firm* — Jones Day (57) ABSTRACT

Computer-implemented systems and methods are described herein for detecting unusually frequent exactly matching and nearly matching test responses. A plurality of test responses for each of a plurality of test takers is received. Evidence of a circulated key from the plurality of test responses is identified by detecting two or more test takers with exactly matching test responses for a plurality of questions. The strength of the evidence of the circulated key is analyzed by determining the probability that the two or more test takers would produce exactly matching test responses, wherein the strength of the evidence is inversely related to the probability. Test takers with nearly matching test responses to the circulated key are then identified. All test takers with exactly matching and nearly matching test responses are tagged for further investigation.

16 Claims, 9 Drawing Sheets

(56) References Cited

U.S. PATENT DOCUMENTS

| | | | |
|---|---|---|---|
| 2015/0179082 A1* | 6/2015 | Byron | G09B 7/00 434/322 |
| 2017/0193834 A1* | 7/2017 | Maharaj | G09B 7/00 |
| 2019/0139431 A1* | 5/2019 | Gordon | G09B 5/00 |
| 2019/0259291 A1* | 8/2019 | Pradhan | A61B 5/4088 |

OTHER PUBLICATIONS

Angoff, William; The Development of Statistical Indices for Detecting Cheaters; Journal of the American Statistical Association, 69(345); pp. 44-49; Mar. 1974.

Belov, Dmitry; Detection of Test Collusion Via Kullback-Leibler Divergence; Journal of Educational Measurement, 50(2); pp. 141-163; Summer 2013.

Belov, Dmitry; Detecting Item Preknowledge in Computerized Adaptive Testing Using Information Theory and Combinatorial Optimization; Journal of Computerized Adaptive Testing, 2(3); pp. 37-58; Oct. 2014.

Bock, R. Darrell; Estimating Item Parameters and Latent Ability When Responses are Scored in Two or More Nominal Categories; Psychometrika, 37(1); pp. 29-51; Mar. 1972.

Drasgow, Fritz, Levine, Michael, Williams, Esther; Appropriateness Measurement with Polychotomous Item Response Models and Standardized Indices; British Journal of Mathematical and Statistical Psychology, 38(1); pp. 67-86; Apr. 1985.

Haberman, Shelby J.; A Stabilized Newton-Raphson Algorithm for Log-Linear Models for Frequency Tables Derived by Indirect Observation; Sociological Methodology, 18; pp. 193-211; 1988.

Haberman, Shelby J.; Latent-Class Item Response Models; Educational Testing Service, Research Report RR-05-28; Dec. 2005.

Haberman, Shelby J.; A General Program for Item-Response Analysis That Employs the Stabilized Newton-Raphson Algorithm; Educational Testing Service, Research Report RR-13-32; Dec. 2013.

Haberman, Shelby J., von Davier, Matthias, Lee, Yi-Hsuan; Comparison of Multidimensional Item Response Models: Multivariate Normal Ability Distributions Versus Multivariate Polytomous Ability Distributions; Educational Testing Service, Research Report RR-08-45, Aug. 2008.

Holland, Paul; Assessing Unusual Agreement Between the Incorrect Answers of Two Examinees Using the K-Index: Statistical Theory and Empirical Support; Educational Testing Service, Research Report RR-96-07; Mar. 1996.

Karabatsos, George; Comparing the Aberrant Response Detection Performance of Thirty-Six Person-Fit Statistics; Applied Measurement in Education, 16(4); pp. 277-298; 2003.

Lee, Yi-Hsuan, Lewis, Charles, von Davier, Alina; Test Security and Quality Control for Multistage Tests; Ch. 19 in Computerized Multistage Testing: Theory and Applications, D. Yan et al. (Eds.); CRC Press: New York, NY; pp. 285-300; 2014.

Lewis, Charles, Thayer, Dorothy; The Power of the K-Index (or PMIR) To Detect Copying; Educational Testing Service, Research Report RR-98-49; Dec. 1998.

McLeod, Lori, Lewis, Charles; Detecting Item Memorization in the CAT Environment; Applied Psychological Measurement, 23(2); pp. 147-160; Jun. 1999.

McLeod, Lori, Lewis, Charles, Thissen, David; A Bayesian Method for the Detection of Item Preknowledge in Computerized Adaptive Testing; Applied Psychological Measurement, 27(2); pp. 121-137; Mar. 2003.

Meijer, Rob, Sijtsma, Klaas; Methodology Review: Evaluating Person Fit; Applied Psychological Measurement, 25(2); pp. 107-135; Jun. 2001.

Mytelka, Andrew; In Alleged Scheme, SAT Was Sent From Thailand Via South Korea to Connecticutt; Chronicle of Higher Education, Jan. 18, 2010.

Penfield, Randall, de la Torre, Jimmy; A New Response Model for Multiple-Choice Items; Paper presented at the 2008 Annual Meeting of the National Council on Measurement in Education; New York, NY; 2008.

Reckase, Mark; Mutlidimensional Item Response Theory; Ch. 18 in Handbook of Statistics, vol. 26, C. Rao & S. Sinharay (Eds ); pp. 607-642; 2007.

Richardson, Lynda; Time-Zone Caper: Suspect Is Arrested In Testing Scheme; The New York Times, Oct. 29, 1996.

Segall, Daniel; An Item Response Model for Characterizing Test Compromise; Journal of Educational and Behavioral Statistics, 27; pp. 163-179; Jun. 2002.

Shu, Zhan, Henson, Robert, Luecht, Richard; Using Deterministic, Gated Item Response Theory Model to Detect Test Cheating Due to Item Compromise; Psychometrika, 78; pp. 481-497; 2012.

Strauss, Valerie; The Six-Step SAT Cheating Operation in Asia— and how to stop it; The Washington Post, Nov. 16, 2014.

Thissen, David, Steinberg, Lynne; A Response Model for Multiple Choice Items; Psychometrika, 49(4); pp. 501-519; Dec. 1984.

Van der Linden, Wim, Guo, Fanmin; Bayesian Procedures for Identifying Aberrant Response-Time Patterns in Adaptive Testing; Psychometrika, 73(3); pp. 365-384; Sep. 2008.

Van der Linden, Wim, Sotaridona, Leonardo; Detecting Answer Copying When the Regular Response Process Follows a Known Response Model; Journal of Educational and Behavioral Statistics, 31(3); pp. 283-304; Fall 2006.

Wollack, James; A Nominal Response Model Approach for Detecting Answer Copying; Applied Psychological Measurement, 21(4); pp. 307-320; Dec. 1997.

Wollack, James, Maynes, Dennis; Detection of Test Collusion Using Cluster Analysis; Ch. 6 in Handbook of Quantitative Methods for Detecting Cheating on Tests, G. Cizek & J. Wollack (Eds.); Rourledge: New York, NY; pp. 124-150; 2016.

Zhang, Yu, Searcy, Cynthia, Horn, Lindsay; Mapping Clusters of Aberrant Patterns in Item Responses; Paper presented at the Annual Meeting of the National Council on Measurement in Education; New Orleans, LA; Apr. 2011.

* cited by examiner

SYSTEMS AND METHODS FOR DETECTING UNUSUALLY FREQUENT EXACTLY MATCHING AND NEARLY MATCHING TEST RESPONSES

This application claims priority to U.S. Provisional Application No. 62/669,432 filed on May 10, 2018, titled "Statistical Procedure for Testing Unusually Frequent Exactly Matching Responses and Nearly Matching Responses" and U.S. Provisional Application No. 62/743,783 filed on Oct. 10, 2018, titled "Automation of Large Volume Analysis Utilizing the AKAD PEM/PNM Algorithm," the entireties of which are herein incorporated by reference.

FIELD

The technology described herein relates generally to statistical procedures evaluating test security and more specifically to detecting unusually frequent exactly matching and nearly matching test responses.

BACKGROUND

In investigations of unusual testing behavior, a common question is whether a specific pattern of responses occurs unusually often within a group of test takers. Modern communication techniques can in some cases permit quite large numbers of test takers to share keys, or common response patterns, to the entire test. Test takers using or sharing the keys are not limited to the same testing location and may have no connection whatsoever outside of utilizing the same key sources. As such, automated test security procedures are an important and challenging research area, specifically in tests administered to a large number of test takers or across a wide geographic region.

SUMMARY

In accordance with the teachings herein, computer-implemented systems and methods are provided for detecting unusually frequent exactly matching and nearly matching test responses. An embodiment of a method for detecting unusually frequent exactly matching and nearly matching test responses comprises receiving a plurality of test responses for each of a plurality of test takers, wherein each test response corresponds to a question on a test distributed to the plurality of test takers. The method further comprises identifying evidence of a circulated key from the plurality of test responses by detecting two or more test takers with exactly matching test responses for a plurality of questions, wherein the exactly matching test responses correspond to a response pattern from the circulated key. The method further comprises analyzing the strength of the evidence of the circulated key by determining a probability that the two or more test takers would produce exactly matching test responses, wherein the strength of the evidence is inversely related to the probability. The method further comprises identifying test takers with nearly matching test responses to the circulated key and tagging the test takers with exactly matching and nearly matching test responses for further investigation.

A computer-implemented system for detecting unusually frequent exactly matching and nearly matching test responses is further described herein, wherein the system comprises one or more data processors and one or more computer-readable storage mediums encoded with instructions for commanding the one or more data processors to execute steps that include the aforementioned method. A non-transitory computer-readable storage medium is further described herein, wherein the storage medium comprises instructions for which when executed cause a processing system to execute steps comprising the aforementioned method.

DETAILED DESCRIPTION

Computer-implemented systems and methods are provided herein for detecting unusually frequent exactly matching responses and nearly matching responses by a plurality of test takers for one or more tests. Specifically, embodiments of the invention described herein can be used to assess key sharing between two or more test takers and/or identify pairs of test takers exhibiting answer copying.

Figure 1:
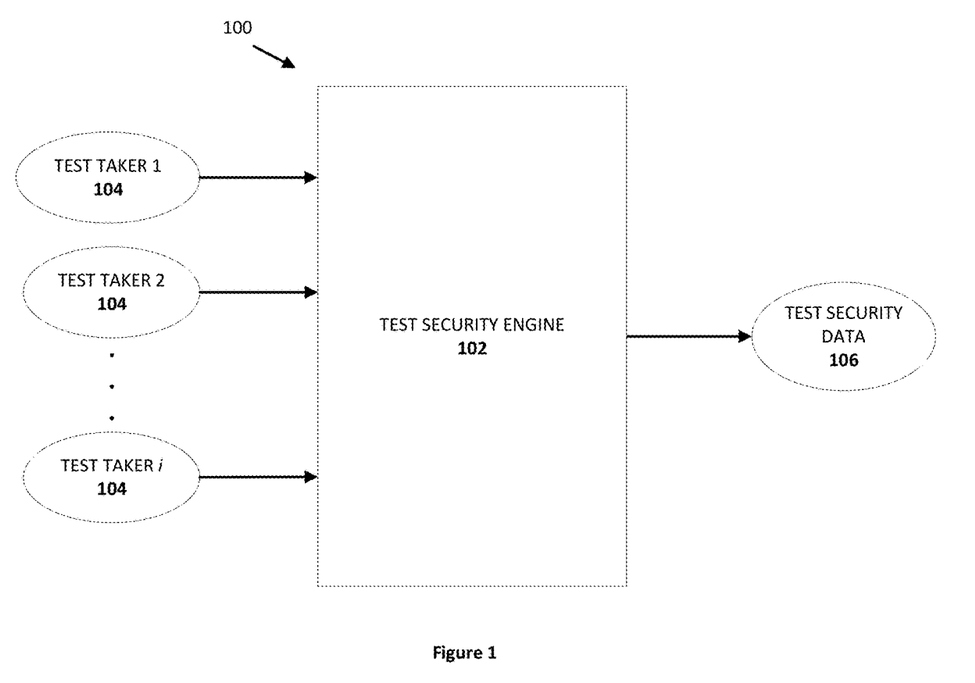
FIG. 1 is a block diagram depicting the generation of test security data in a computer-implemented environment.

FIG. 1 depicts an embodiment of a computer-implemented environment 100 where a test security engine 102 produces test security data 106 for a plurality of test takers 104. As discussed further below, test security data may include evidence of a circulated key being used among test takers and/or evidence of answer copying between pairs of test takers.

Figure 2:
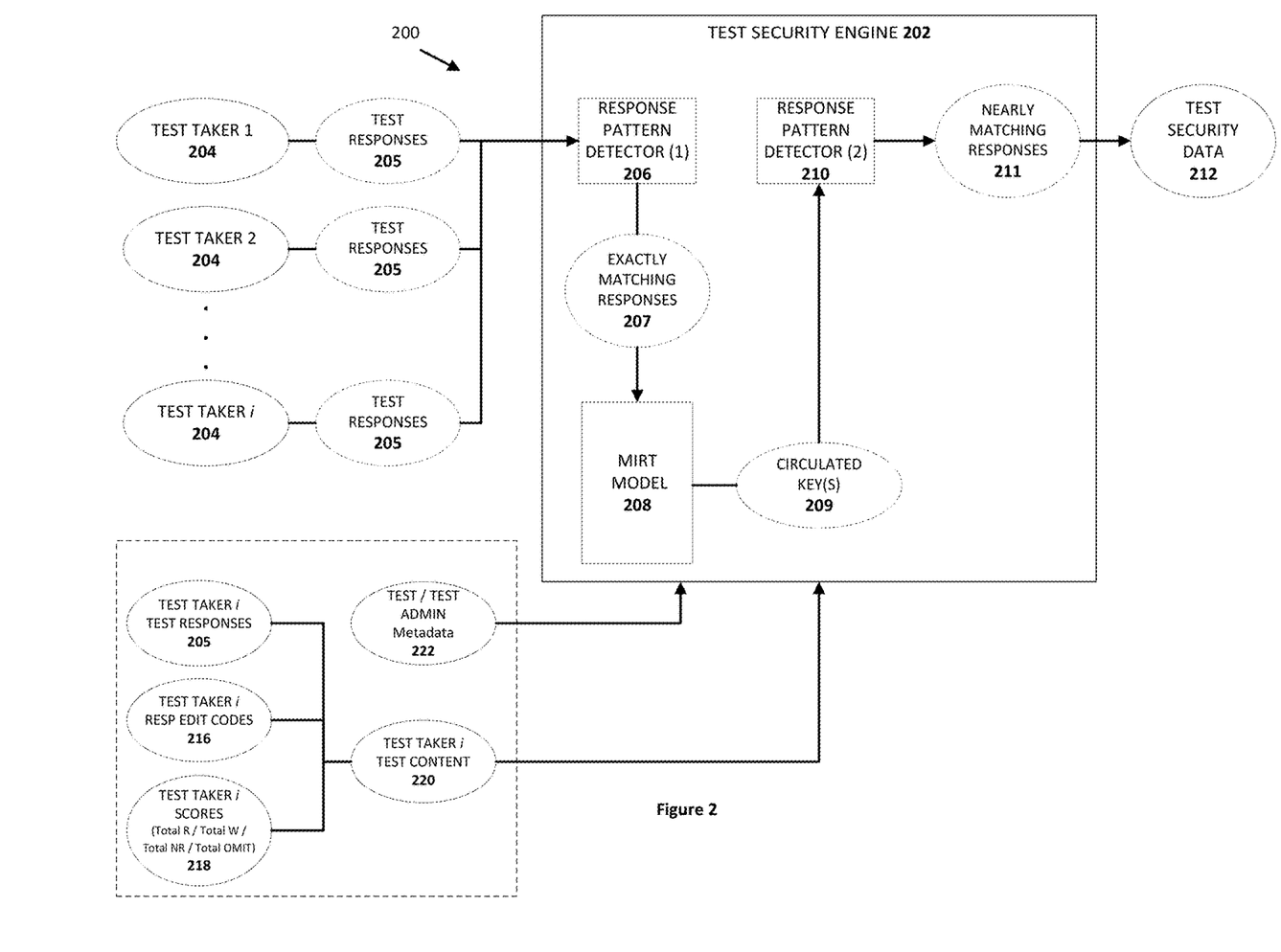
FIG. 2 is a block diagram depicting the processing of test responses to generate test security data in a computer-implemented environment.

In embodiments, multidimensional item-response theory (MIRT) is employed to aid in both key identification and in identification of test takers who may be employing such a key. FIG. 2 depicts a computer-implemented embodiment 200 where a test security engine 202 produces test security data 212 for a plurality of test takers 204 by utilizing, in part, an MIRT model 208. In the FIG. 2 embodiment, test responses 205 for I number of test takers 204 are analyzed by the test security engine 202, where I>1. In embodiments, I is user-defined based upon the intended analysis. For example, in the Response Analysis application (to be addressed below in reference to FIG. 5), it is assumed that I≥1,000. In other embodiments, the number of test takers may be less or more than 1,000 depending on the MIRT model.

In the first stage of the depicted procedure, test takers with test responses that exactly match (i.e., "exact matching") are identified by response pattern detector (1) 206. The identified exactly matching responses 207 are then analyzed by the MIRT model 208.

Embodiments of the MIRT model 208, discussed further below, yield probabilities that test takers of different ability levels will select exactly matching item choices. The probabilities serve to assess whether such exact matches are so unusual that they should be of interest for analysis of test security or for exclusion from equating and linking. Unusual exactly matching test patterns are flagged as potential circulated keys 209. Once circulated keys 209 are identified, additional analysis at the second stage is conducted to identify test takers with response patterns unusually similar to the circulated keys (i.e., "near matching"). Near matching is identified in addition to exact matching to account for user error in applying a circulated key. Response pattern detector (2) 210 identifies those test takers who produced nearly matching responses 211 to the one or more circulated key 209. The test security engine 202 then outputs test security data 212, which may include potential circulated keys, a list of test takers who produced exactly matching responses, a list of test takers who produced nearly matching responses to potential circulated keys, and/or probabilities produced by the MIRT model.

In embodiments, test security engine 202 analyzes additional test taker content 220 for one or more test takers when generating test security data 212, as depicted by the dashed box in FIG. 2. In addition to a test taker's responses 205, response edit codes 216 and scoring information 218 may be input into the system. Embodiments of test security engine 202 can also analyze various types of test and test administration metadata, such as item type data (e.g., multiple choice, numeric entry, multiple selection, etc.) and/or test location data. Further details on data analysis will be discussed in reference to FIG. 5 below.

Figure 3:
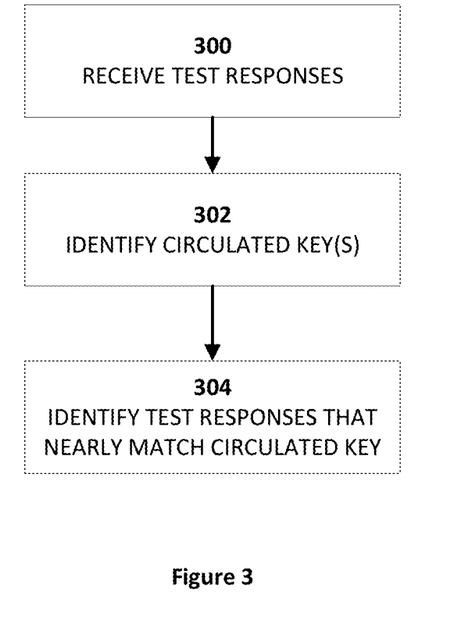
FIG. 3 is a flow diagram depicting an example method for identifying a circulated key.

Turning to FIG. 3, an example method for implementing the procedure is described. At 300, a computer receives a plurality of test responses from a group of two or more test takers. The method is not location-dependent, so the test takers to be evaluated may or may not be from the same testing center. Next, the presence of circulated keys is detected at 302. As discussed in detail below, evidence of circulated keys is analyzed by evaluating unusual exactly matching test responses across a group of test takers. After one or more circulated keys have been detected, test takers with nearly matching responses to the circulated keys are identified at 304. While this method is described in reference to detecting circulated keys, the process may also be employed to identify direct answer copying among pairs of test takers.

As discussed, embodiments of the proposed procedure are intended to identify test takers in an administration who exhibit unusual similarity in responses to the entire test in groups of any size greater than one. When analyzing test responses, it is important to consider not just the item scores for test taker responses but also the specific responses supplied that are incorrect or receive only partial credit. Tests evaluating one or more skills may be analyzed.

An embodiment of the proposed model is hereinafter described with reference to equations (1)-(10). In this embodiment, $D \geq 1$ skills are tested, with each item in the test relating to a specific skill. (In other embodiments, the model may be reduced to D=1 to test only one skill.) The assessment is taken by I test takers numbered from 1 to I, and J scored items numbered from 1 to J are given to all test takers. The response for test taker i to item j is denoted by $X_{ij}$, and $X_i$ is the J-dimensional vector with elements $X_{ij}$ for $1 \leq j \leq J$. In embodiments, $X_i = X_T$ if all responses of test taker i are correct (i.e., $x_T$ is the true key of the test), and element j of $x_T$ is $x_{jT}$ for $1 \leq j \leq J$. For each item j is a corresponding skill d(j) between 1 and D. To ensure stable parameter estimation in the current embodiment of the model, it is assumed that for each skill there are at least three items. There are $r_j > 1$ possible item responses for item j numbered from 0 to $r_j - 1$, and each response x for item j has a corresponding integer item score $S_j(x)$ between 0 and SAO.

For right-scored items, the item score $S_j(x)$ is 1 if $x = x_{jT}$ for item j, and is otherwise 0. In embodiments where item j is not right-scored, then more than two values of the item score $S_j(x)$ may be present. In typical applications, the minimum item score 0 corresponds to a completely wrong response, and the maximum score $S_j(x_{jT})$ corresponds to a completely satisfactory response. Other item scores reflect partial credit for the answer. Additionally, in situations in which test takers sometimes fail to answer items, the item response 0 corresponds to an omission.

In embodiments, the model is a latent structure model with a multivariate normal latent variable $\theta_i$ of dimensional D for each test taker i. The pairs $(X_i, \theta_i)$, $1 \leq i \leq I$, are assumed independent and identically distributed, and the $X_{ij}$, $1 \leq j \leq J$, are conditionally independent given $\theta_i$. The $\theta_i$ are assumed to have a common positive-definite covariance matrix, and to each item response x to item j corresponds an intercept $\beta_{xj}$, a slope $a_{xj}$, and a guessing parameter $c_j$ between 0 and 1. The conditional probability that the item response $X_{ij} = x$ given $\theta_i = \omega$ is:

$$p_j(x|\omega) = c_j S_j(x) + (1-c_j)\frac{\exp(a_{xj}\omega_{d(j)} + \beta_{xj})}{\sum_{x'=0}^{r_j-1}\exp(a_{x'j}\omega_{d(j)} + \beta_{x'j})}, \quad (1)$$

where $\omega$ is a D-dimensional vector with elements $\omega_{d(j)}$, $1 \leq d(j) \leq D$.

All right-scored items j are assumed to have the same positive guessing parameter $c_j = c < 1$, and $c_j = 0$ for all other items. In embodiments, further restrictions may be imposed to identify model parameters, but such restrictions are not necessary for the estimation of the required probabilities. In the current embodiment, the simplifying assumptions is made that $a_{xj} = a_{x'j}$ if $S_j(x) = S_j(x')$, so that the response $X_{ij}$ and the latent vector $\theta_i$ are conditionally independent given the item score $S_j(X_{ij})$. If $S_j(x) = s$, then the conditional probability $p_{jX|S}(x|s)$ that $X_{ij} = x$ given $S_j(X_{ij}) = s$ has the elementary maximum-likelihood estimate:

$$\hat{p}_{jX|S}(x|s) = N_{xj}/N_{sj}^S, \quad (2)$$

where $N_{xj}$ is the number of test takers i with $X_{ij} = x$ and $N_{sj}^S > 0$ is the number of test takers i with $S_j(X_{ij}) = s$.

Maximum-likelihood estimates are used in the analyses of the current embodiment. The maximum-likelihood estimate of $p_j(x|\omega)$ is denoted by $\hat{p}(x|\omega)$. If the J-dimensional x with elements $x_j$, $1 \leq j \leq J$, is in the set X of possible values of $X_i$, then the conditional probability that $X_i = x$ given $\theta_i = \omega$ is:

$$p(x|\omega) = \prod_{j=1}^{J} p_j(x_j|\omega) \quad (3)$$

The corresponding estimate is:

$$\hat{p}(x|\omega) = \prod_{j=1}^{J} \hat{p}_j(x_j|\omega). \quad (4)$$

If $f(\omega)$ denotes the probability density of $\theta_i$ at $\omega$, then the probability $p(x)$ that $X_i = x$ is:

$$p(x) = \int p(x|\omega)f(\omega)d\omega \quad (5)$$

If $\hat{f}(\omega)$ denotes the estimated probability density of $\theta_i$ at $\omega$, the maximum-likelihood estimate of $p(x)$ is:

$$\hat{p}(x) = \int \hat{p}(x|\omega)\hat{f}(\omega)d\omega. \quad (6)$$

Embodiments of the MIRT analysis may be conducted with a general program for item-response analysis that computes $\hat{p}(X_i)$ for each test taker i. The aforementioned equations, probabilities, and defined variables provide the basis for the procedure as described further below.

As previously described, embodiments of the test security engine produce test security data for a plurality of test takers taking a test. As discussed in reference to FIG. 2 above, a first stage of the application is identifying test takers with exactly matching test responses. In a test with a substantial number of items, relatively few test takers will have the exact same response vector X, because the set X of possible values of $X_i$ is extremely large. Therefore, this observation can provide a basis for identifying test takers who may be using a common key. In an embodiment, the test takers to be analyzed are test-takers in a single testing location. In other embodiments, test takers taking the same test at different sites may be analyzed. That is, applications of the models described herein are not limited to a single testing area.

To identify test takers with exactly matching responses, a separate investigation may be undertaken for each test taker in a set C of m≤1 test takers requiring attention. If an entire test administration is examined at once, then C is the set of all test takers in the administration and m=I. If only a single test center is of interest, then m may be a far smaller positive integer, and C is the set of test takers in the test center. For each test taker i in C, the number $M_i$ of test takers i' in C, where i'≠i, is computed for whom $X_{i'}=X_i$, so that each item response of test taker i' is the same as the corresponding item response of test taker i. Given the observed test taker response $X_i$, the probability under the model that $M_i$ or more of test takers i' in C, i'≠i, would have $X_{i'}=X_i$ is the binomial probability:

$$B_i = \sum_{n=M_i}^{m-1} \binom{m-1}{n} [p(X_i)]^n [1-p(X_i)]^{m-n-1}, \quad (7)$$

where $p(X_i)$ is given in equation (5) above.

In the current embodiment, the entire test administration is examined at once, so that $p(X_i)=p(X_i|C)$, where C includes all test takers. Under the model, for any u in the unit interval, u is not less than the probability $P(B_i \leq u)$ that $B_i \leq u$. By the Bonferroni inequality, the probability that $B_i \leq u$ for any test taker i in C does not exceed mu. The estimated value of $B_i$ is:

$$\hat{B}_i = \sum_{n=M_i}^{m-1} \binom{m-1}{n} [\hat{p}(X_i)]^n [1-\hat{p}(X_i)]^{m-n-1}, \quad (8)$$

where $\hat{p}(X_i)$ is given in equation (6) above and estimated based on all test takers in the administration. Thus, the Bonferroni significance level for test taker i for the number of matching responses is the minimum of $m\hat{B}_i$ and 1. Test takers in C with the same response vector $X_i$ have identical $m\hat{B}_i$ values.

In embodiments, identifying the number of test takers with the same response vector can be readily accomplished by sorting observations by $X_i$ for test takers i in C. Such sorting is used to complete identification of all distinct response vectors and their frequency of use. Returning to the FIG. 2 embodiment, identification of test takers with the same response vector is completed by response pattern detector (1) 206. When a number of test takers share the same response vector and the corresponding values of $m\hat{B}_i$ are very small among them, the common response vector is strong evidence of a key being circulated among the group of test takers. Strong evidence that a key is circulated does not by itself imply that every test taker with that response pattern is using the circulated key. Further investigation may be employed to examine each particular test taker's connection to the potential circulated key in order to gather information concerning individual testing behaviors.

Further, small values of $m\hat{B}_i$ may be observed in large groups with a not uncommon response pattern $X_i$. This is likely to occur for test takers with near-perfect scores. Because those test takers are more likely to match the response patterns by chance, a more conservative approach may be taken in certain embodiments by not identifying such near-perfect response patterns as circulated keys. For this purpose, a further test may be implemented. For example, let $X_K$ be a set of response patterns $x_K$ identified as circulated keys, where $x_K$ is of dimension J with element $x_{jK}$ for 1≤j≤J. Let $X_K$ have k elements. For each $x_K$ in $X_K$, the probability that a test taker i has a response $X_i=x_K$ is estimated to be $\hat{p}(x_K)$, so that the estimated probability that any test taker in C has this response pattern does not exceed $m\hat{p}(x_K)$. If both $m\hat{p}(X_i) \leq 0.01$ and $m\hat{B}_i \leq 0.01$ with $X_i=x_K$, then test taker i is identified as using the circulated key $x_K$. In embodiments where the number k of circulated keys is relatively large (e.g., k>5), then the requirement that $m\hat{p}(X_i) \leq 0.01$ may be changed to the requirement that $mk\hat{p}(X_i) \leq 0.01$ to account for the number of circulated keys examined with Bonferroni corrections. In general, in embodiments in which $\hat{p}(X_i)$ is greater than $\hat{B}_i$, inferences about individual test takers with a given response pattern may differ from inferences about the existence of a circulated key with that response pattern.

After strong evidence of one or more circulated keys is detected from the data, test takers with near matching responses to the circulated keys are then identified. Test takers in possession of a circulated key may not always apply the key correctly to produce exactly matching responses. Such test takers may instead produce test responses that only nearly match the circulated key. Such error may occur, for example, if the test takers apply the circulated key under high pressure in the testing room, if they must memorize the circulated key rather than bring a copy to the testing center, or if the provided key is imperfect. Thus, additional analysis is considered in embodiments to compare a circulated key $x_K$ with the response pattern of every test taker in C.

Returning to the FIG. 2 embodiment, identification of test takers with nearly matching response vectors is completed by response pattern detector (2) 210. In embodiments, nearly matching test response patterns may be detected by first scoring the test of each test taker based on the circulated key $x_K$. Next, each test taker's responses are scored based on the true key $x_T$. Both scores are compared to determine if the score on the circulated key is significantly better than the score on the true key. As discussed above, $x_{jK}$ and $x_{jT}$ (where 1≤j≤J) are elements of $x_K$ and $x_T$, respectively. In embodiments, the alternative item score $S_{jK}(x)$ for response x to item j is $S_j(x_{jT})$ if $x=x_{jK}$, and $S_{jK}(x)$ for response x to item j is $S_j(x_{jK})$ if $x=x_{jT}$. For other values of x, $S_{jK}(x)=S_j(x)$. Then, the total score:

$$T_{iK} = \sum_{j=1}^{J} S_{jK}(X_{ij}) \quad (9)$$

is compared to the conventional total:

$$T_i = \sum_{j=1}^{J} S_j(X_{ij}). \quad (10)$$

In embodiments, a better score on the circulated key compared to the true key suggests that the circulated key is being used. To complete the analysis, C' consists of test takers in C not already identified as exactly matching an unusually large number of test takers, and m' is the number of test takers in C'. As discussed prior in the case of exact matching, the Bonferroni inequality is then employed, so that for each test taker in C', the significance level used is $m'\hat{P}_{iK}$ for test taker i. In embodiments where the test taker's responses are compared with multiple circulated keys, the significance level could be adjusted by multiplying it by the number of circulated keys considered in the analysis.

Figure 4:
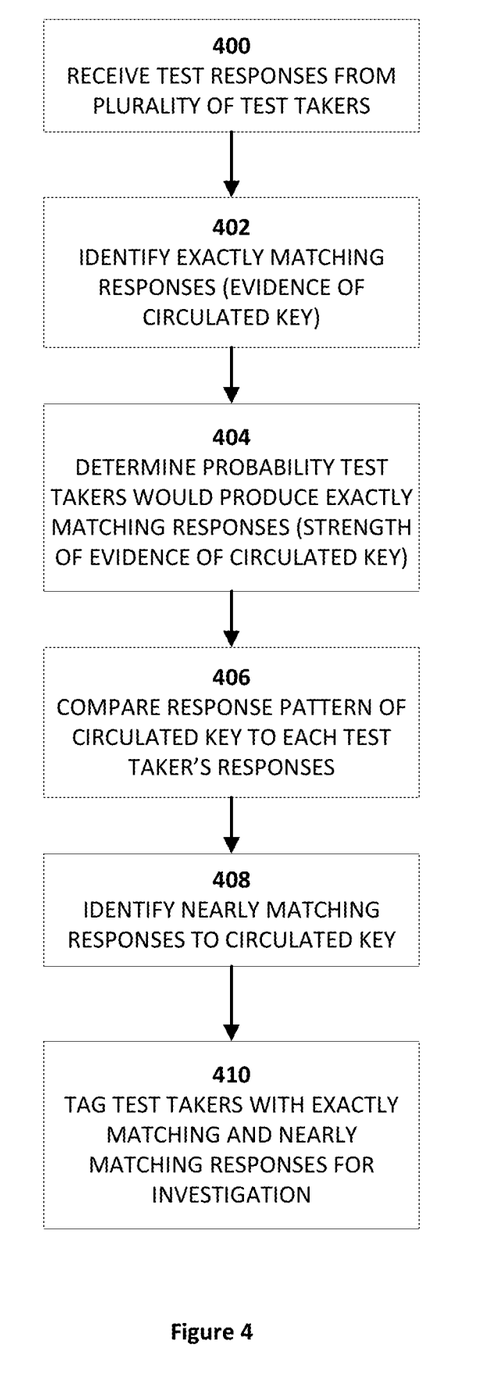
FIG. 4 is a flow diagram depicting an example method for identifying and analyzing evidence of a circulated key.

Turning to FIG. 4, an example computer-implemented method for testing unusually frequent exactly matching and nearly matching test responses is described. At 400, a plurality of test responses for each of a plurality of test takers is received, wherein each test response corresponds to a question on a test distributed to the plurality of test takers. At 402, evidence of one or more circulated keys is identified from the plurality of test responses by detecting two or more test takers with exactly matching test responses for a plurality of questions. As discussed previously, the exactly matching test response vectors correspond to a response pattern from the potential circulated key. Next, at 404, the strength of the evidence of the circulated key is analyzed by determining a probability that the two or more test takers would produce exactly matching test responses, wherein the strength of the evidence is inversely related to the probability. That is, the less likely two or more test takers produced the same exact response pattern, the more likely they were using a circulated key. After one or more circulated keys have been identified, the response pattern of all remaining test takers (those that have not already been identified in step 402 for exact matching) are compared to the response pattern of the circulated key in order to identify those test takers with nearly matching responses to the circulated key. All identified test takers are then tagged for further investigation at 410 to analyze individual testing behaviors.

Figure 5:
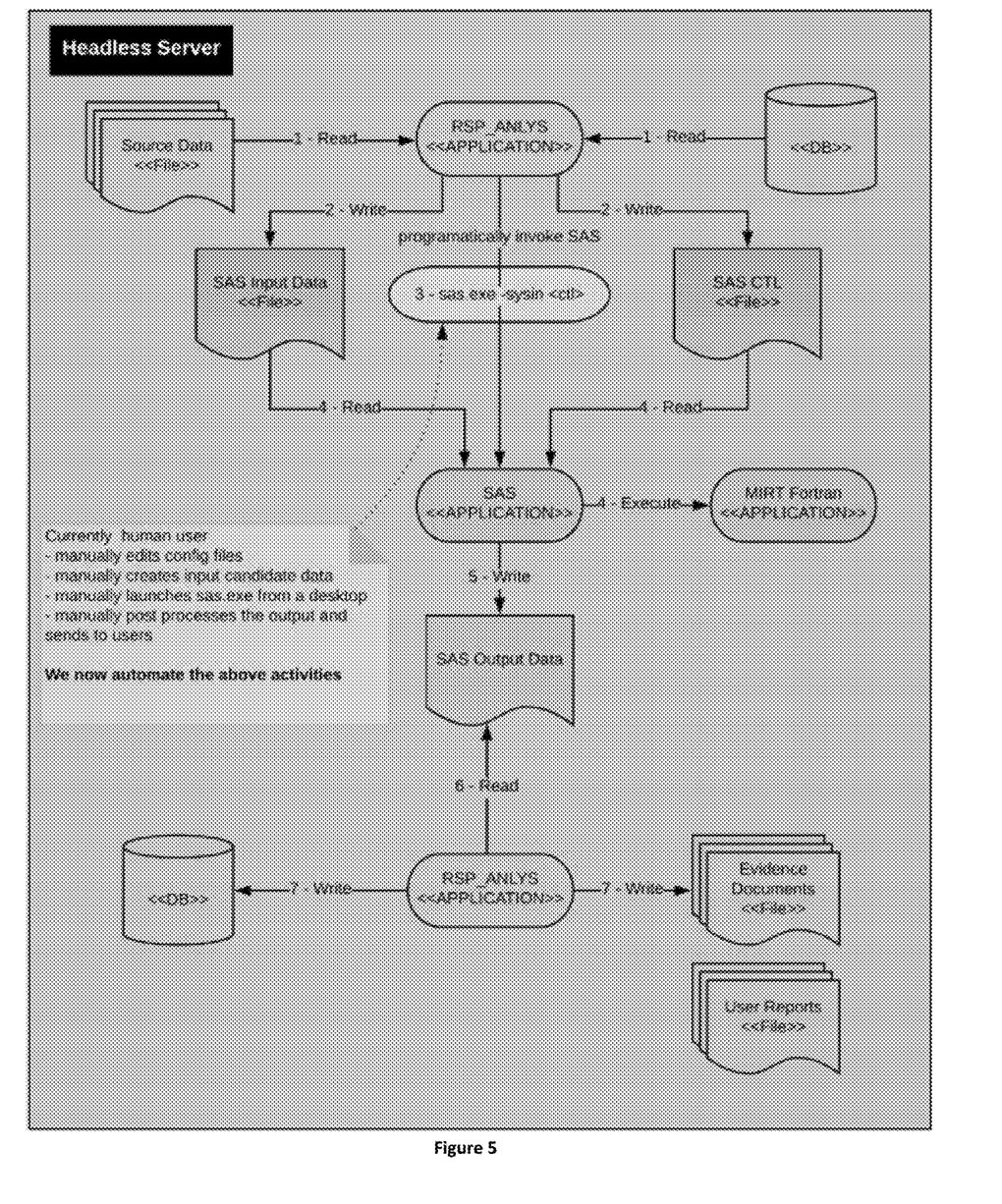
FIG. 5 depicts a computer-implemented application for analyzing test response data.

In embodiments, test response data may be analyzed using the Response Analysis application depicted in FIG. 5. Embodiments of the Response Analysis application can automatically analyze arbitrary test data responses representing a set of test takers having the same operational test content at high capacities. In embodiments, test takers can be grouped for analysis based on user-defined criteria. For example, test takers may be grouped by operational test content, by test attributes (e.g., test center, locality, test date, month of administration, etc.), or by an ad hoc grouping defined explicitly by a unique identifier such as registration number.

In embodiments, the output of the application is a generated set of PEM and PNM groups loaded into a database to allow querying, user display, and report generation. Embodiments of the Response Analysis application can convert test taker response data comparable across all test takers regardless of whether different testing forms were used, different orders of sections were given, or different orders of items within a section were different. All test takers that experience the same operational content at the section level can be grouped together and provided to a processor for analysis, such as the AKAD PEM/PNM Engine developed by ETS Research.

In embodiments, end users provide data via a user interface that describes the format of the input data, form and section (e.g., MATH/READING/WRITING), and threshold parameters. The user provided data is then passed to the engine performing the analysis.

The Response Analysis application performs ETL (Extract/Transform/Load) processing that converts the data to a common canonical format regardless of the input format. Therefore, the application has the ability to process large volumes of data efficiently with minimal time and processing capacity required. Additionally, the application has the ability to abstract the input data to the engine to allow onboarding of any test program and test once the initial onboarding and calibration by research of the required parameters are determined. This abstraction is done at both the data and architecture level so that any data source representing a data set can be analyzed provided that the data required to be passed to the engine is available.

Once converted to a canonical common format, each section's responses are stored as two large contiguous blocks of data. The first block may contain each test taker's answers converted to an ordinal number that represents a unique response across all test takers for that item. The second block may contain edit codes that relate to each response in the first block and can indicate any additional specific information required for analysis of each test response, such as Right, Wrong, Omitted, Not Reached, Do Not Score, etc. In the conversion process, additional metadata that provides information required for the processing of the block of responses and edit codes can be generated and passed to the engine.

In embodiments, additional translation of raw responses to ordinal representation is implemented during the creation of the input to analysis. Some additional data that may be utilized is item edit codes (e.g., Not Reached, Omitted, etc.) and/or item type (e.g., multiple choice, numeric entry, multiple selection, etc.). Additional post-processing of test taker responses, such as the normalization of numbers (i.e., translating different representations of the same number, like "1.0," "1," "+1," to the same numeric value of 1 in order to map to the same ordinal value for analysis), may be specified.

In embodiments, the output of the engine after execution is flat files that describe the results of the analysis. These files define groups of test takers that met either PEM, PNM or both PEM and PNM thresholds. The group description may contain the type of group (PEM or PNM), the cardinality of the group, unique identifiers of the members of the group that relate back to the test taker, an identifier for the group, the form and section pertaining to the group, the generated probabilities for either PEM or PNM, and any additional statistics that apply to the group. After each execution for a particular form and section, all PEM and PNM groups are extracted from the output data and stored and normalized in a relational database. Once stored in the database, all user outputs can be efficiently extracted and queries of all of the PEM and PNM groups can be executed efficiently.

In the FIG. 5 embodiment, Response Analysis programmatically generates SAS execution script for each set of runs that execute the automated analysis. However, any external statistical method other than SAS (e.g., R, SPSS) that implemented the algorithm could be utilized and invoked by Response Analysis.

The methods and systems described herein may be implemented using any suitable processing system with any suitable combination of hardware, software and/or firmware, such as described below with reference to the non-limiting examples of FIGS. 6, 7A, 7B, and 7C.

Figure 6:
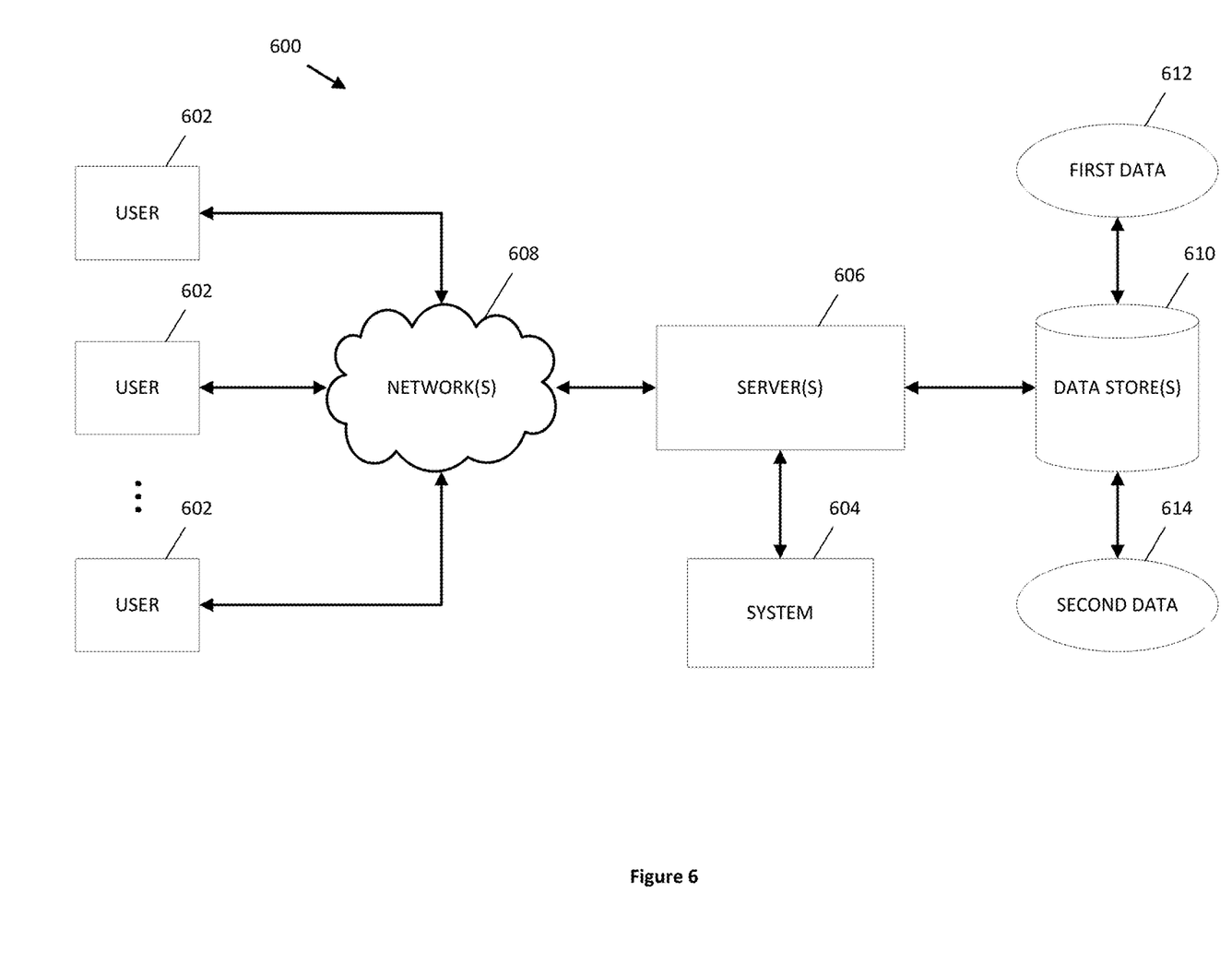
FIG. 6 depicts a computer-implemented environment wherein users can interact with a test security system.

FIG. 6 depicts at 600 a computer-implemented environment wherein users 602 can interact with a system 604 hosted on one or more servers 606 through a network 608. The system 604 contains software operations or routines. The users 602 can interact with the system 604 through a number of ways, such as over one or more networks 608. One or more servers 606 accessible through the network(s) 608 can host system 604. It should be understood that the system 604 could also be provided on a stand-alone computer for access by a user.

Figure 7A:
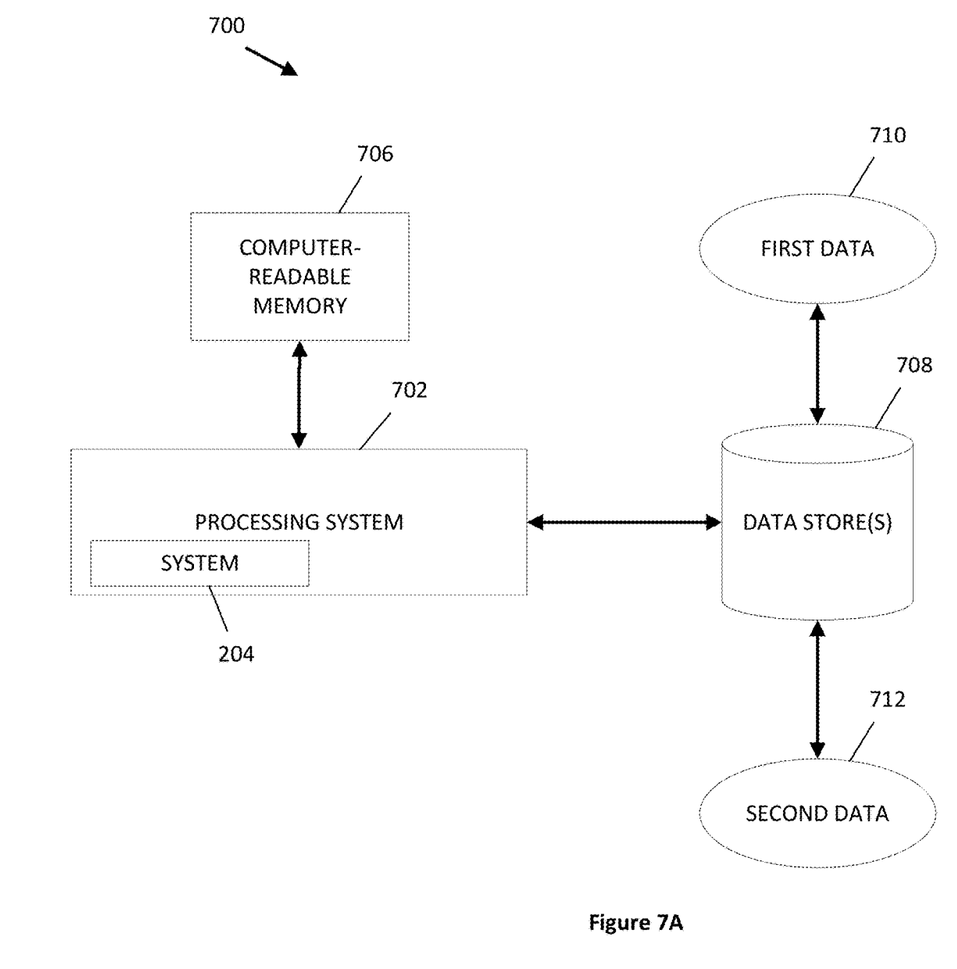
FIGS. 7A, 7B, and 7C depict example systems for use in implementing a test security system.
Figure 7B:
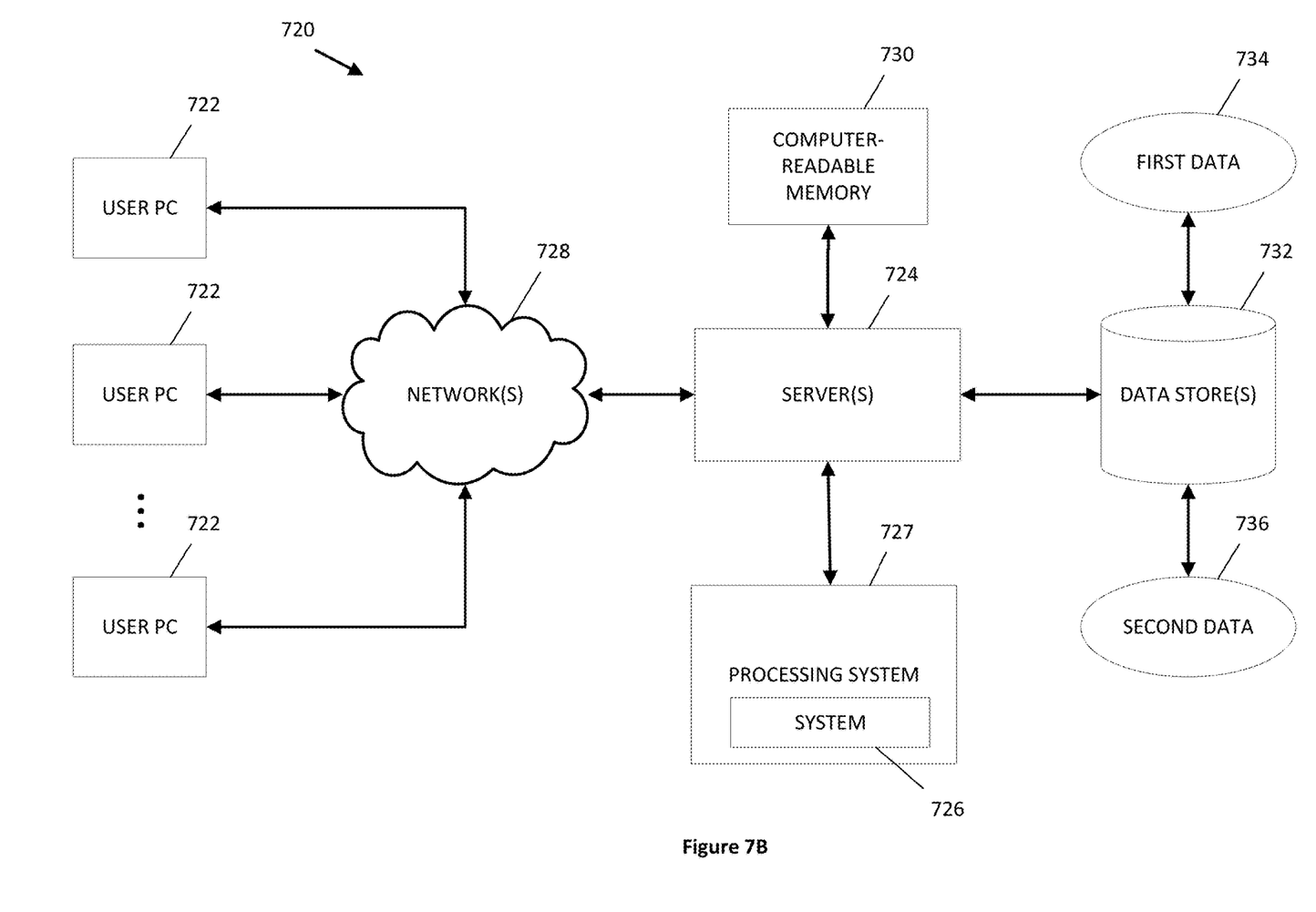
Figure 7C:
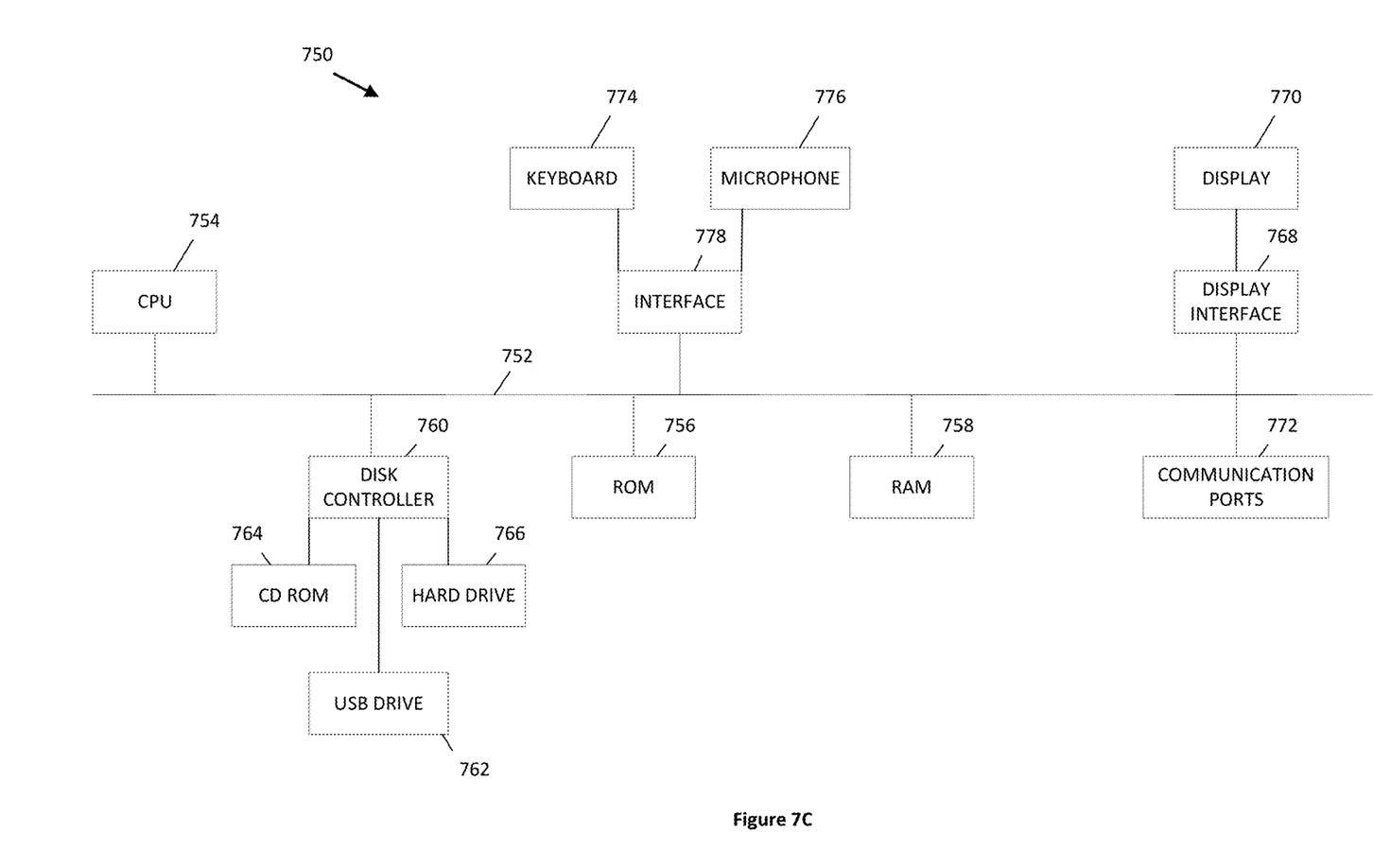

FIGS. 7A, 7B, and 7C depict example systems for use in implementing a system. For example, FIG. 7A depicts an exemplary system 700 that includes a standalone computer architecture where a processing system 702 (e.g., one or more computer processors) includes a system 704 being executed on it. The processing system 702 has access to a non-transitory computer-readable memory 706 in addition to one or more data stores 708. The one or more data stores 708 may contain first data 710 as well as second 712.

FIG. 7B depicts a system 720 that includes a client server architecture. One or more user PCs 722 access one or more servers 724 running a system 726 on a processing system 727 via one or more networks 728. The one or more servers 724 may access a non-transitory computer readable memory 730 as well as one or more data stores 732. The one or more data stores 732 may contain first data 734 as well as second data 736.

FIG. 7C shows a block diagram of exemplary hardware for a standalone computer architecture 750, such as the architecture depicted in FIG. 7A, that may be used to contain and/or implement the program instructions of system embodiments of the present invention. A bus 752 may serve as the information highway interconnecting the other illustrated components of the hardware. A processing system 754 labeled CPU (central processing unit) (e.g., one or more computer processors), may perform calculations and logic operations required to execute a program. A non-transitory computer-readable storage medium, such as read only memory (ROM) 756 and random access memory (RAM) 758, may be in communication with the processing system 754 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 760 interfaces one or more optional disk drives to the system bus 752. These disk drives may be external or internal USB drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 778 may permit information from the bus 752 to be displayed on a display 770 in audio, graphic, or alphanumeric format. Communication with external devices may optionally occur using various communication ports 772.

In addition to the standard computer-type components, the hardware may also include data input devices, such as a keyboard 774, or other input device 776, such as a microphone, remote control, pointer, mouse and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes the plural reference unless the context clearly dictates otherwise. Also, as used in the description herein and throughout the claims that follow, the meaning of "in" includes "on" unless that context clearly dictates otherwise. Finally, as used in the description herein and throughout the claims that follow, the meanings of "and"

and "or" include both the conjunctive and disjunctive and may be used interchangeably unless the context expressly dictates otherwise; the phrase "exclusive or" may be used to indicate a situation where only the disjunctive meaning may apply.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method for detecting unusually frequent exactly matching and nearly matching test responses, comprising:
    receiving a plurality of test responses for each of a plurality of test takers, wherein each test response corresponds to a question on a test distributed to the plurality of test takers;
    identifying evidence of a circulated key from the plurality of test responses by detecting two or more test takers with exactly matching test responses for a plurality of questions, wherein the exactly matching test responses correspond to a response pattern from the circulated key;
    analyzing a strength of the evidence of the circulated key by determining a probability that the two or more test takers would produce exactly matching test responses, wherein the strength of the evidence is inversely related to the probability;
    identifying test takers with nearly matching test responses to the circulated key; and
    tagging the test takers with exactly matching test responses and the test takers with nearly matching test responses for further investigation.

2. The computer-implemented method of claim 1, wherein identifying test takers with nearly matching test responses to the circulated key comprises:
    scoring the test responses of each test taker based on the circulated key;
    scoring the test responses of each test taker based on a true key; and
    comparing both scores, wherein a better score on the circulated key compared to the true key is evidence that the circulated key is being used.

3. The computer-implemented method of claim 1, wherein evidence of more than one circulated key is identified and analyzed.

4. The computer-implemented method of claim 1, wherein all of the test responses for each of a plurality of test takers are from a single testing center.

5. The computer-implemented method of claim 1, wherein the plurality of test responses for each of a plurality of test takers are from more than one testing center.

6. A computer-implemented system for detecting unusually frequent exactly matching and nearly matching test responses, comprising:
    one or more data processors;
    one or more computer-readable storage mediums encoded with instructions for commanding the one or more data processors to execute steps that include:
        receiving a plurality of test responses for each of a plurality of test takers, wherein each test response corresponds to a question on a test distributed to the plurality of test takers;
        identifying evidence of a circulated key from the plurality of test responses by detecting two or more test takers with exactly matching test responses for a plurality of questions, wherein the exactly matching test responses correspond to a response pattern from the circulated key;
        analyzing a strength of the evidence of the circulated key by determining a probability that the two or more test takers would produce exactly matching test responses, wherein the strength of the evidence is inversely related to the probability;
        identifying test takers with nearly matching test responses to the circulated key; and
        tagging the test takers with exactly matching test responses and the test takers with nearly matching test responses for further investigation.

7. The computer-implemented system of claim 6, wherein identifying test takers with nearly matching test responses to the circulated key comprises:
    scoring the test responses of each test taker based on the circulated key;
    scoring the test responses of each test taker based on a true key; and
    comparing both scores, wherein a better score on the circulated key compared to the true key is evidence that the circulated key is being used.

8. The computer-implemented system of claim 6, wherein evidence of more than one circulated key is identified and analyzed.

9. The computer-implemented system of claim 6, wherein all of the test responses for each of a plurality of test takers are from a single testing center.

10. The computer-implemented system of claim 6, wherein the plurality of test responses for each of a plurality of test takers are from more than one testing center.

11. A non-transitory computer-readable storage medium comprising instructions for which when executed cause a processing system to execute steps comprising:
    receiving a plurality of test responses for each of a plurality of test takers, wherein each test response corresponds to a question on a test distributed to the plurality of test takers;
    identifying evidence of a circulated key from the plurality of test responses by detecting two or more test takers with exactly matching test responses for a plurality of questions, wherein the exactly matching test responses correspond to a response pattern from the circulated key;
    analyzing a strength of the evidence of the circulated key by determining a probability that the two or more test takers would produce exactly matching test responses, wherein the strength of the evidence is inversely related to the probability;
    identifying test takers with nearly matching test responses to the circulated key; and
    tagging the test takers with exactly matching test responses and the test takers with nearly matching test responses for further investigation.

12. The non-transitory computer-readable storage medium of claim 11, wherein identifying test takers with nearly matching test responses to the circulated key comprises:

scoring the test responses of each test taker based on the circulated key;

scoring the test responses of each test taker based on a true key; and comparing both scores, wherein a better score on the circulated key compared to the true key is evidence that the circulated key is being used.

13. The non-transitory computer-readable storage medium of claim 11, wherein identifying test takers with nearly matching test responses to the circulated key comprises:

scoring the test responses of each test taker based on the circulated key;

scoring the test responses of each test taker based on a true key; and comparing both scores to determine if a score on the circulated key is significantly better than a score on the true key.

14. The non-transitory computer-readable storage medium of claim 11, wherein evidence of more than one circulated key is identified and analyzed.

15. The non-transitory computer-readable storage medium of claim 11, wherein all of the test responses for each of a plurality of test takers are from a single testing center.

16. The non-transitory computer-readable storage medium of claim 11, wherein the plurality of test responses for each of a plurality of test takers are from more than one testing center.

\* \* \* \* \*